United States Patent [19]

McNeill, Jr.

[11] Patent Number: 5,110,465
[45] Date of Patent: May 5, 1992

[54] COMPACT WASTE WATER TREATMENT FACILITY

[76] Inventor: Willie B. McNeill, Jr., P.O. Drawer 5618, Tallahassee, Fla. 32314

[21] Appl. No.: 593,434

[22] Filed: Oct. 5, 1990

[51] Int. Cl.$^5$ .............................................. B01L 20/00
[52] U.S. Cl. ................................... 210/199; 210/200; 210/208; 210/219; 210/259; 210/926
[58] Field of Search ............... 210/199, 200, 208, 219, 210/220, 256, 259, 926

[56] References Cited

U.S. PATENT DOCUMENTS

| | | | |
|---|---|---|---|
| D. 172,340 | 6/1954 | Dean | D25/32 |
| 584,736 | 6/1897 | Goodhue | 210/532.1 |
| 2,154,897 | 4/1939 | Grant | 52/79.4 |
| 2,886,855 | 5/1959 | Petter | 52/79.4 |
| 2,901,114 | 8/1959 | Smith et al. | 210/200 |
| 2,959,256 | 11/1960 | Dean | 189/1 |
| 3,152,366 | 10/1964 | McCrory et al. | 20/2 |
| 3,753,897 | 8/1973 | Lin et al. | 210/208 X |
| 3,769,766 | 11/1973 | Speidel | 52/73 |
| 3,791,080 | 2/1974 | Sjoberg | 52/79 |
| 3,906,691 | 9/1975 | Grenet | 52/237 |
| 3,908,321 | 9/1975 | Cox et al. | 52/79 |
| 4,634,526 | 1/1987 | Salkeld et al. | 210/219 X |

OTHER PUBLICATIONS

McNeill Company, Inc., The Quad System.

Primary Examiner—Charles Hart
Attorney, Agent, or Firm—Shlesinger, Arkwright & Garvey

[57] ABSTRACT

A compact waste treatment facility comprises an optional surge basin, an aeration basin, a settling basin, and a digester basin. The basins are interconnected in the order named for therewith providing a sequentially arranged waste treatment facility. Each of the basins is comprised of six integral walls which are substantially equiangularly disposed one to the other so that each basin is hexagonally shaped in plan. Each basin has a wall common with the basin interconnected therewith. Each basin has an assembly for supplying fluid treated therein to the next interconnected basin. An aerator is provided in the aeration basin for causing fluid flow thereabout.

30 Claims, 4 Drawing Sheets

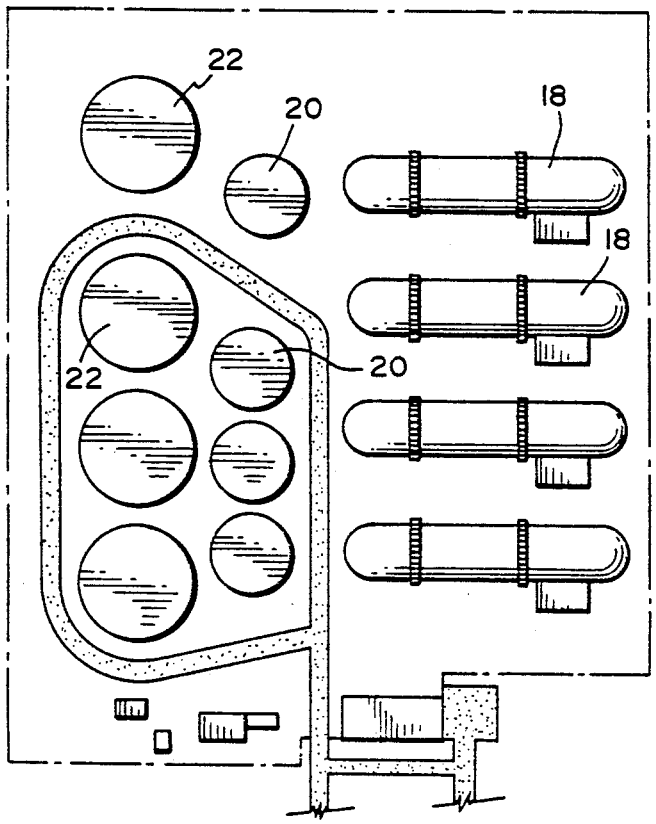
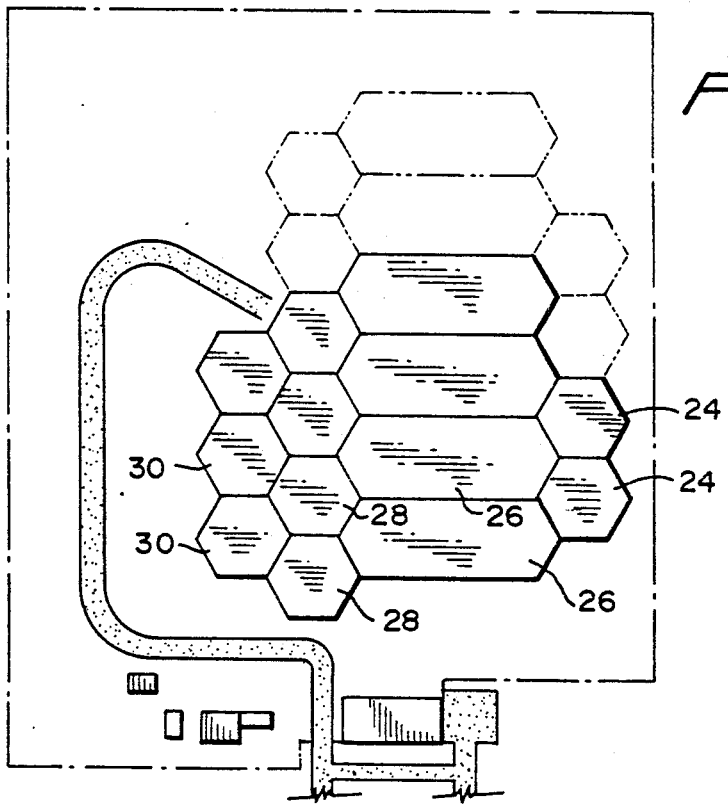

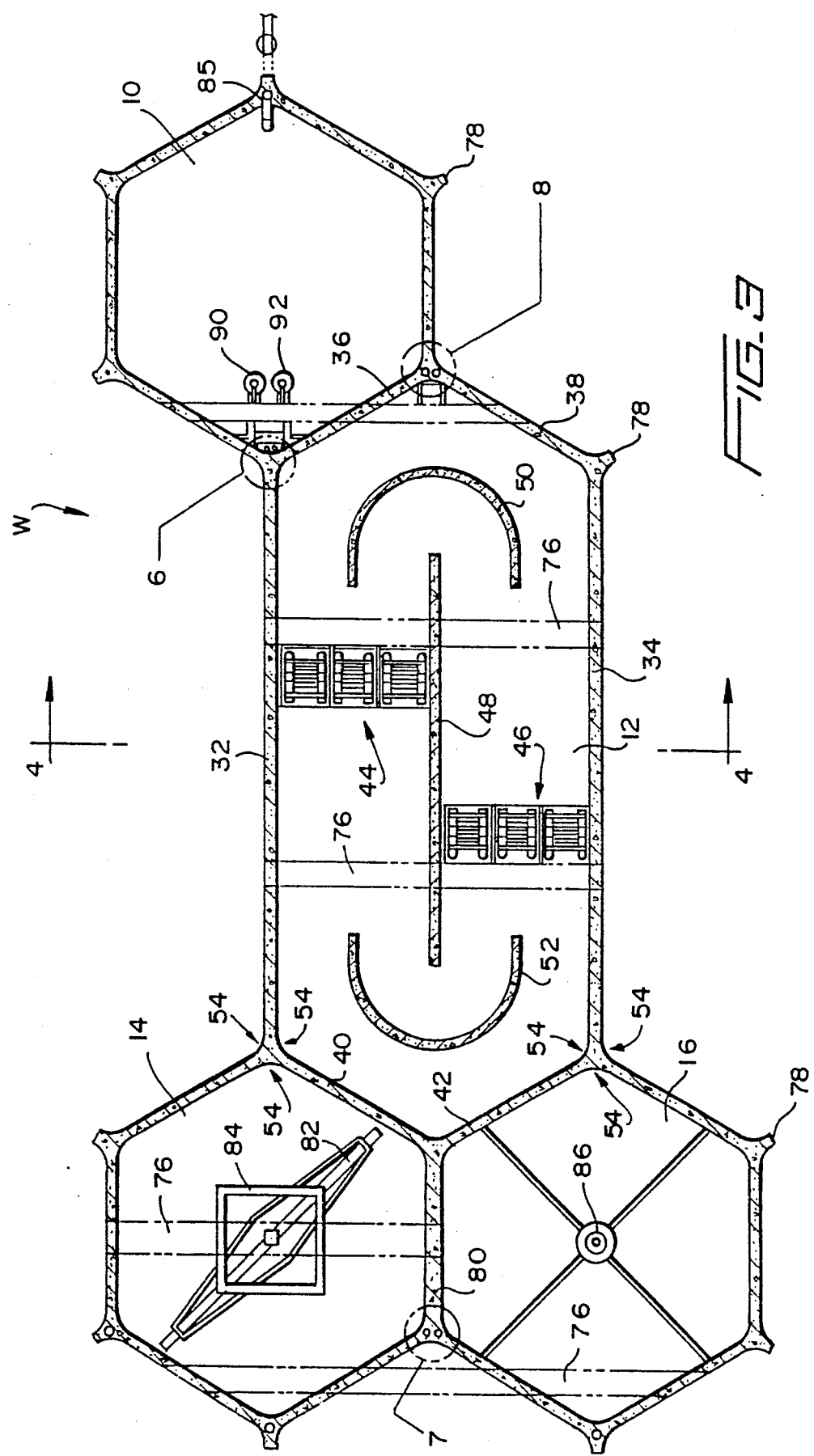

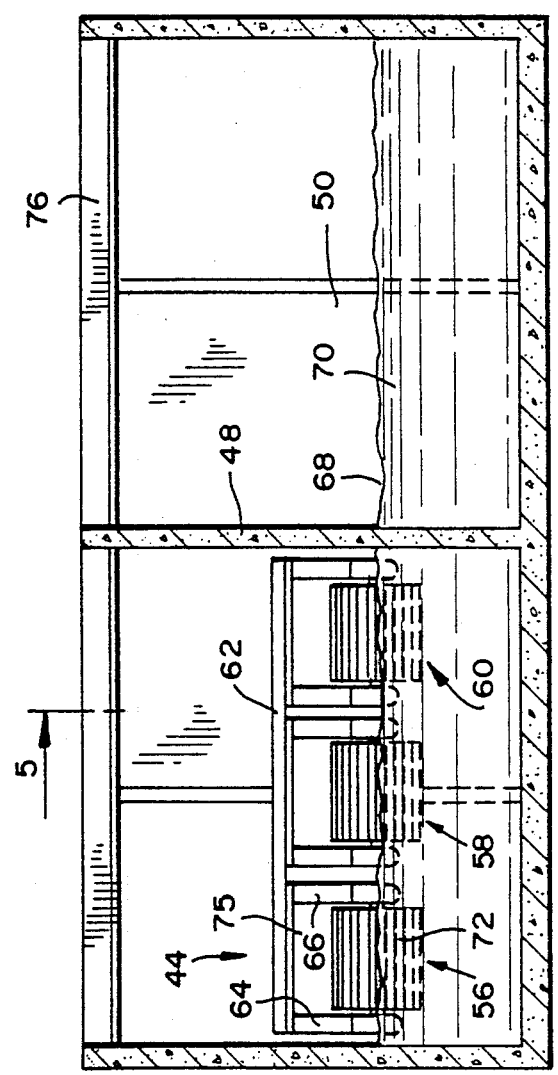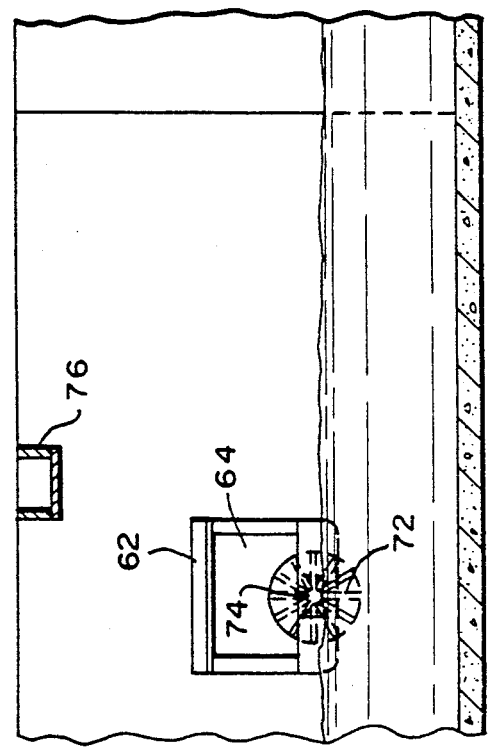

COMPACT WASTE WATER TREATMENT FACILITY

BACKGROUND OF THE INVENTION

Continuing concerns over pollution of ground water supplies has increased the need for the construction of residential and commercial waste water treatment facilities. The need for the treatment facilities is particularly acute in those areas which are growing rapidly or are experiencing shortfalls in water supply. In many areas of the country, localities are experiencing both a water shortage and rapid growth.

Conventional waste water treatment techniques employ a number of tanks or basins which are interconnected through pipes, pumps, and similar plumbing. These facilities not only are expensive to construct, but also occupy much land. Since each facility occupies a relatively large area of land, then expansion is made further more expensive and/or difficult in view of the need to acquire additional land. Also, the piping cost for the facilities can be quite high in view of the distance between the tanks.

A typical waste water treatment facility will have an optional surge tank or basin, for smoothing out fluctuations in waste water input, followed by a number of subsequent processing tanks. Many systems employ an aeration tank wherein oxygen is added to the waste water for causing carbon to be consumed. A settling tank typically follows the aeration tank in order to permit debris and solids to be separated from the aerated water. The sediment from the settling tank may thereafter be directed optionally to a sludge digester, or normally to the inlet of the aeration tank.

Those skilled in the art will appreciate that there is a need for a waste water treatment facility which is relatively inexpensive to construct, which occupies a relatively small amount of land, and which readily permits expansion as required. The disclosed invention is just such a waste water treatment facility.

OBJECTS AND SUMMARY OF THE INVENTION

The primary object of the disclosed invention is a waste water treatment facility which is inexpensive to construct, which occupies minimal land, and which readily permits expansion.

A compact waste treatment facility according to the invention includes an optional surge basin, an aeration basin, a settling basin, and a digester basin. The basins are interconnected in the order named for therewith providing a sequentially arranged waste treatment facility. Each of the basins is comprised of six integral walls which are substantially equiangularly disposed one to the other, so that each basin is hexagonally shaped in plan. Each basin has a wall common with the basin interconnected therewith. Means are operably associated with each of the basins for supplying fluid treated therein to the next interconnected basin, and means are operably associated with the aeration basin for causing fluid flow thereabout.

A waste water treatment facility according to the invention includes two or more sequentially oriented honeycomb-shaped cementitious basins, with each basin connected to at least one other basin by a joint wall. Means are operably associated with an end one of said basins for supplying waste water to be treated thereto, and means are operably associated with an oppositely disposed end one of said basins for removing treated waste water therefrom. Means are operably associated with each of the basins for causing waste water therein to be discharged to the sequentially next basin, and means are operably associated with an intermediate one of the basins for aerating waste water therein.

These and other objects and advantages of the invention will be readily apparent in view of the following description and drawings of the above described invention.

DESCRIPTION OF THE DRAWINGS

The above and other objects and advantages and novel features of the present invention will become apparent from the following detailed description of the preferred embodiment of the invention illustrated in the accompanying drawings, wherein:

FIG. 1 is a schematic view of a waste water treatment facility according to the invention with the dotted line showing illustrating potential expansion;

FIG. 2 is a schematic view of a prior art waste water treatment facility;

FIG. 3 is a top plan view of a waste water treatment facility according to the invention with portions shown in phantom;

FIG. 4 is a cross-sectional view taken along the line 4—4 of FIG. 3 and viewed in the direction of the arrows;

FIG. 5 is a cross-sectional view taken along the line 5—5 of FIG. 4 and viewed in the direction of arrows;

DETAILED DESCRIPTION OF THE INVENTION

Figure 6:
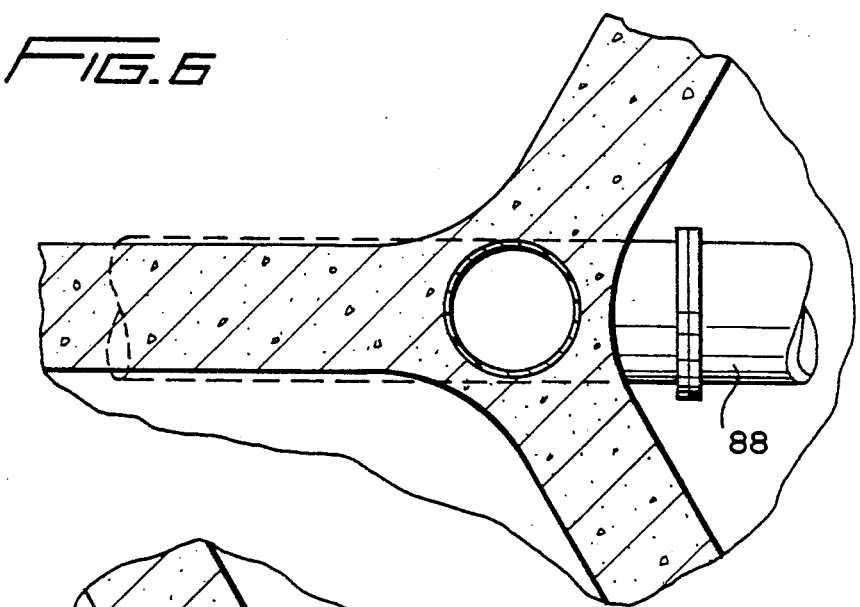
FIG. 6 is a top plan view, partially in section, of a detail of FIG. 3.

Waste water treatment facility W, as best shown in FIG. 3, include an optional surge basin 10, an aeration basin 12, a settling basin 14, and a sludge digester basin 16. Each of the basins 10, 12, 14 and 16 is comprised of a cementitious material, such as concrete, and is of a honeycomb format in plan. I have found that the six (6) sided honeycomb format permits maximum utilization of available space while simultaneously permitting a significant reduction in piping and expansion costs.

FIG. 2 discloses a conventional waste water treatment facility comprising a plurality of aeration basins 18 interconnected by appropriate piping (not shown) to clarifiers 20 and digesters 22. FIG. 1 discloses a second embodiment of the facility of FIG. 3 as applied to a land area corresponding to the land area of FIG. 2. The facility of FIG. 1 includes a plurality of surge basins 24 operably interconnected each with at least two aeration basins 26 through appropriate pumps and pipes (not shown). The interconnection of each aeration basin 26 with two surge basins 24 maximizes flexibility in operation and maintenance, since water to be treated may be directed to either of two basins for aeration as required. Each aeration basin 26 is operably connected by a valved weir to at one or more settling basins 28, each of which is then connected to a digester 30 by pumps (not shown).

The phantom line showing in FIG. 1 illustrates the additional two, at least, treatment facilities which may be installed in the same land area as is occupied by the four facilities of FIG. 2. Not only is there an increase in land usage, but the hexagonal configuration of the basins 24, 26, 28 and 30, each of which shares a support wall in common with the interconnected basin, minimizes piping costs and facilitates expansion. The common wall design, allowing water storage on both sides, greatly reduces the amount of concrete required for a given facility since lateral support is provided. The facility of FIG. 1 permits a greater number of treatment plants per unit space, while the use of plural surge and settling basins for each aeration basin maximizes flexibility in a manner not before possible.

Each of the basins 10, 12, 14 and 16 of FIG. 3, as with the basins 24, 26, 28 and 30 of FIG. 1, is hexagonal in plan, although other configurations may be used. Each of the basins has six (6) side walls equiangularly disposed one to the other. The side walls of the basins 10, 14 and 16 are of a uniform length. This common length assures that each of the basins 10 14 and 16 is of substantially the same size and may therefore be constructed from the same forms, therefore minimizing construction costs.

The aeration basin 12 of FIG. 3 likewise is hexagonal in plan, with six walls equiangularly disposed relative one to the other. Unlike the basins 10, 14 and 16, the basin 12 has parallel side walls 32 and 34 which are of a length substantially in excess of the length of side walls 36, 38, 40 and 42. The side walls 32 and 34 are much longer than the other side walls in order to create an aeration basin 12 which has a residence period sufficient for satisfactory treatment of the incoming waste water. Those skilled in the art understand that some period of time is required for the aeration process to proceed to the desired completion, and the residence period is therefore a function of the quality of the incoming water, the amount of aeration, and the desired quality of the output water.

In order to facilitate aeration, I provide a plurality of floating aeration assemblies 44 and 46, which aerate the water while also driving it about the basin 12. Preferably, each of the aeration assemblies 44 and 46 is disposed on one side of a concrete divider 48 which has a length less than the length of the parallel side walls 32 and 34 and is interposed therebetween. The aeration assemblies 44 and 46 substantially span the distance between the divider 48 and the associated side walls 32 and 34, respectively. The aeration assemblies 44 and 46 cooperate with each other in facilitating flow about the basin. In addition, I provide flow guide baffles 50 and 52 within the basin 12 at opposite ends of the divider 48. The baffles 50 and 52 are likewise formed of concrete, and are U-shaped in plan. Each of the baffles 50 and 52 is spaced from an associated end of the divider 48, and also from the associated endwalls 36 and 38 or 40 and 42, respectively. Each of the baffles 50 and 52 has somewhat linear portions extending longitudinally along the divider 48, with the result that each end of the divider 48 is nestled within its associated baffle. The ends of the divider 48 are uniformly spaced from the linear portions of the baffles 50 and 52, so that substantially uniform flow is achievable in the bisected basin 12. The baffles 50 and 52 cooperate with the divider 48 in order to facilitate substantially complete flow of the water about the basin 12. The aeration basin may also be equal sided, like the digester, with one floating aerator in the center. In this instance the internal divider and baffle walls would not be required.

The floating aeration assemblies 44 and 46 permit the aeration basin to seave as a surge basin, since variations in volume will be accomodated by vertical displacement of the aeration assemblies 44 and 46. If a surge basin is used, then the floating assemblies 44 and 46 act to dampen flow from the surge basin and provide additional capacity for high flow periods. Thus, since the floating assemblies will have a high and a low position, the difference therebetween provides surge capacity.

A typical hexagon has rather sharp angles between adjacent walls, which sharp angles might be sufficient to cause flow perturbations. For this reason, I have smoothed and rounded-off the angle between adjacent walls, such as the walls 34 and 42, as a means for reducing flow inefficiencies. The rounded-off portion 54, is provided at the interconnection of the side walls of each of the basins 10, 12, 14 and 16 in order to cause the associated basin to more accurately resemble an oval or circle, as appropriate. The rounded-off portion 54 at the walls 34 and 42 is exemplary. The oval shape is more accommodating to flow, and thereby the rounded-off portions 54 permit greater flow efficiencies to be achieved than would be possible with the usual sharp angles.

The aeration assemblies 44 and 46 are identical, and the aeration assembly 44 is more particularly shown in FIGS. 4 and 5. The aeration assembly 44, as best shown in FIG. 4, includes aerators 56, 58 and 60 interconnected by planar member 62. Each of the aerators has side supports 64 and 66 disposed in parallel and sufficiently buoyant to maintain the aerator at a selected level relative to the surface 68 of the waste water 70. Extending between each of the parallel supports 64 and 66 is a paddlewheel-shaped drive 72 which is driven about axis 74 by a motor assembly 75 operably associated therewith. The drives 72 of the aeration assemblies 44 rotate about a common axis 74 at the same rotational speed in order to cause the water 70 to flow about the basin 12. I prefer that each of the aeration assemblies 44 and 46 include a plurality of aerators, such as the three aerators of FIG. 4, in order to permit one aerator to be serviced and/or replaced while the other associated aerators are operating. This capability further assures flexibility for the waste water facility W since the aeration basin 12 can continue to be operated while the maintenance and/or replacement occurs.

Similarly, I prefer that each of the aeration assemblies 44 and 46 in their supports 64 and 66 be constructed of buoyant material in order to maintain the drives 72 at the same position relative to the surface 68 of the water 70. Those skilled in the art will appreciate that the level of the surface 68 will fluctuate in response to the water input from surge basin 10. Permitting the aeration assemblies 44 and 46 to float on the surface 68 assures that substantially the same driving force will be applied to the water 70 by each of the aerators 56, 58 and 60 at all times. The drives 72 will always extend substantially the same depth into the water 70, so that substantially the same force must be applied for causing rotation of same. Such a construction minimizes imbalances which could occur if the drives 72 extended a different distance into the water 70 at any point in time.

FIGS. 3, 4 and 5 show walkways 76 extending across the top of the basins 12, 14 and 14-16 as a means for further improving access to the various components of the facility W.

FIG. 3 discloses stub walls 78 extending from each intersection of the side walls of basins 10, 12, 14 and 16 which are not interconnected to an adjacent basin. It can be noted in FIG. 3 that the basin 10 shares wall 36 with the basin 12, thereby facilitating construction since the basins 10 and 12 share this common wall. The interconnection of walls 34 and 38, however, is not with another basin with the result that I provide a relatively short wall 78 extending complementarily outwardly therefrom. The stub walls 78 provide additional vertical reinforcement at the point of interconnection of the walls 38 and 34, and also provide an interconnection point in the event expansion proceeds. For example, should it be decided to expand the facility W of FIG. 3, then it would be relatively simple matter to construct another aeration basin 12, either along the wall 32 or the wall 34. This is because at least two walls have already been formed, and the stub walls 78 have already been poured to permit construction of the remaining walls. Once the facility W has been constructed, then expansion can easily occur since each additional facility will share many of the walls poured for the earlier facility, such as shown in FIG. 1.

It can all so be noted from FIG. 3 that the basin 14 shares the wall 40 with the basin 12, and also shares the wall 80 with the basin 16. As with the basin 10, the usage of common or joint walls for adjacent basins facilitates construction while simultaneously minimizing costs. In addition, since the basins 10, 12, 14 and 16 are interconnected to each other through their common walls, then any piping which must be run will, of necessity, be of a relatively short length. Connection of two adjacent basins normally will only require a flow-thru window in the common wall. This again minimizes costs, and piping costs can be rather substantial in a conventional waste treatment facility.

FIG. 3 discloses the rotary clarifier 82 extending from flow box 84 within settling basin 14. A floating aerator 86 is positioned within digester 16 and is of a type well known in the art.

Figure 7:
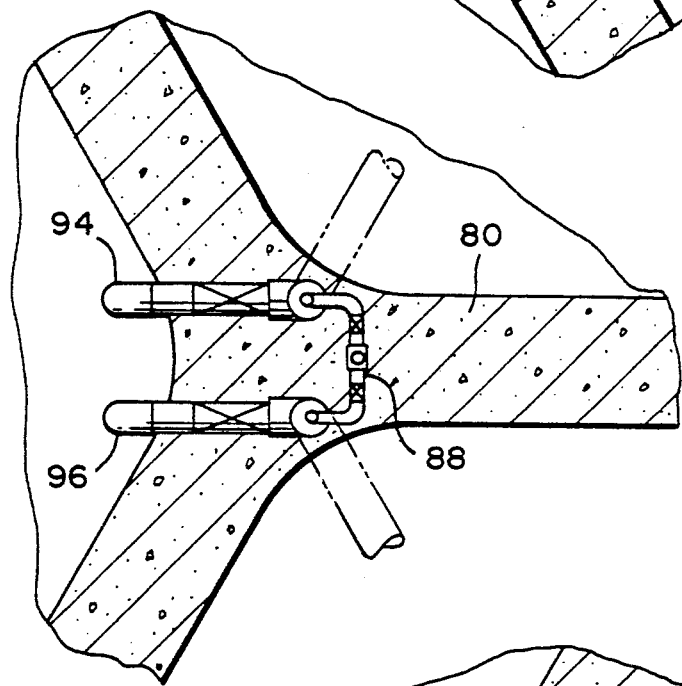
FIG. 7 is a top plan view with portions shown in phantom of yet a further detail of FIGS. 3; and, FIG. 8 is a top plan view with portions shown in phantom of yet an additional detail of FIG. 3.
Figure 8:
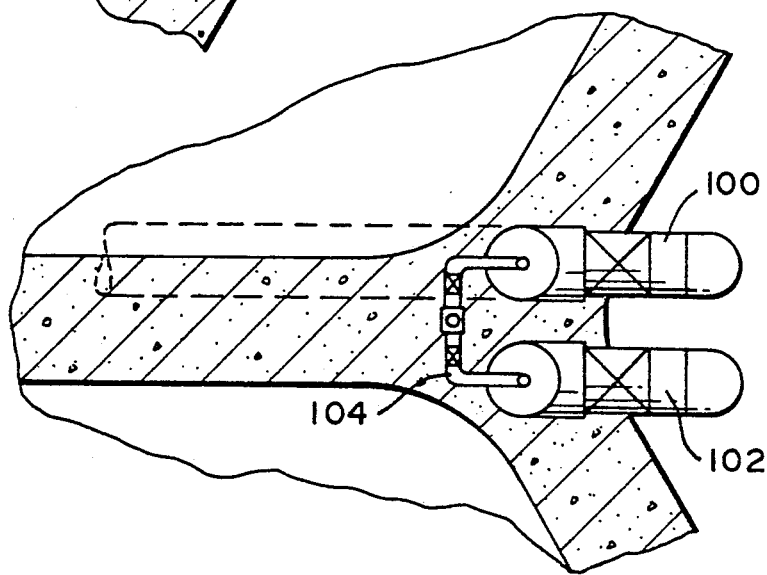

FIG. 6 discloses effluent pipe 88 which causes pumps 90 and 92 of FIG. 3 to direct water from the surge basin 10 into the aeration basin 12. Water to be treated is supplied to surge basin 10 by inlet pipe 85, as best shown in FIG. 3. FIG. 7 discloses lines 94 and 96 which are interconnected by air line 98. Finally, FIG. 8 discloses lines 100 and 102 interconnected by air line 104. The piping of FIGS. 6, 7 and 8 is illustrative of the ability of the waste water facility W to encapsulate piping within the concrete used for forming the walls of the basins. Encapsulation of the piping helps to minimize freezing in cold climates.

While this invention has been described as having a preferred design, those skilled in the art will understand that further uses, modifications, and/or adaptations may be made thereto without departing from the general principles of the invention while still falling within the scope of the claims appended hereto.

What I claim is:

1. A compact waste treatment facility, comprising:
   a) an aeration basin, a settling basin, and a digester basin, said basins being interconnected in the order named for therewith providing a sequentially arranged waste treatment facility;
   b) each of said basins comprised of six integral walls which are substantially equiangularly disposed one to the other so that each basin is hexagonally shaped in plan, and each basin has a wall common with the basin interconnected therewith; and,
   c) means operably associated with said aeration basin for causing fluid flow thereabout.

2. The facility of claim 1, wherein:
   a) two oppositely disposed walls of said aeration basin have a common length substantially exceeding the length of the other walls of said aeration basin.

3. The facility of claim 1, wherein:
   a) each wall of said surge, settling and digester basins has a length substantially equal to the length of the other walls of the associated basin.

4. The facility of claim 2, wherein:
   a) each wall of said surge, settling and digester basins has a length substantially equal to the length of the other walls of the associated basin 5. The facility of claim 2, wherein:
   a) the walls of said surge, settling and digester basins have a common length.

6. The facility of claim 2, wherein:
   a) a divider is disposed within said aeration basin intermediate said two walls and said the divider has a length less than said common length.

7. The facility of claim 6, wherein:
   a) first and second flow guide baffles disposed within said aeration basin, each of said baffles positioned adjacent an end of said divider.

8. The facility of claim 7, wherein:
   a) each of said baffles has a first portion extending longitudinally parallel to said divider.

9. The facility of claim 8, wherein:
   a) each of said baffles is U-shaped and opens toward said divider.

10. The facility of claim 1, wherein:
    a) a stub wall extends from each basin at the interconnection of the walls thereof not common to another basin.

11. The facility of claim 10, wherein:
    a) each of said stub walls has a length substantially less than the length of the walls of the associated basin.

12. The facility of claim 10, wherein:
    a) each of said walls is comprised of a cementitous material.

13. The facility of claim 1, wherein said means for causing fluid flow includes:
    a) a paddle assembly comprising a plurality of interconnected paddles; and,
    b) means operably associated with said paddle assembly for causing rotation of said paddles about a common axis.

14. The facility of claim 13, wherein:
    a) means are operably associated with said paddle assemblies for maintaining said paddle assemblies relative to the surface of the fluid in said aeration basin.

15. The facility of claim 6, wherein said means for causing fluid flow includes:
    a) first and second cooperating fluid drive means, each fluid drive means associated with one of said two walls.

16. The facility of claim 15, wherein:
    a) each fluid drive means comprises a paddle assembly including a plurality of interconnected paddles and means operably associated with the paddle assemblies for causing rotation of the paddles about a common axis.

17. The facility of claim 16, wherein:
    a) each fluid drive means extends between said divider and the associated one of said two walls.

18. The facility of claim 17, wherein:
a) each fluid drive means includes a plurality of paddle assemblies disposed in alignment for rotation of the associated paddles about a common axis.

19. The facility of claim 16, wherein:
a) means are operably associated with each paddle assembly for maintaining the paddle assembly relative to the surface of fluid in said aeration basin.

20. The facility of claim 2, wherein:
a) said surge and settling basins are disposed adjacent a common one of said two walls.

21. The facility of claim 20, wherein:
a) said settling and digester basins have a common wall.

22. The facility of claim 1, further comprising:
a) a surge basin upstream of and integrally connected to said aeration basin, said surge basin having six equiangularly disposed integral walls and said surge basin having a wall common to said aeration basin.

23. A waste water treatment facility, comprising:
a) two or more sequentially oriented honeycomb-shaped cementitous basins, each basin connected to at least one other basin by a joint wall;
b) means operably associated with an end one of said basins for supplying waste water to be treated thereto and means operably associated with an oppositely disposed end one of said basins for removing treated waste water therefrom; and,
c) means operably associated with an intermediate one of said basins for aerating waste water therein.

24. The facility of claim 23, wherein:
a) each of said basins has a plurality of side walls, and the side walls are equiangularly disposed relative one to another.

25. The facility of claim 24, wherein:
a) said intermediate one basin includes a divider disposed adjacent a parallel two of the associated side walls and of a length less than the length of said two side walls.

26. The facility of claim 25, wherein:
a) first and second flow guide baffles are spaced from and disposed adjacent an associated end of said divider.

27. The facility of claim 26, wherein:
a) each of said baffles is U-shaped and has a first portion extending longitudinally along said divider and a second portion extending arcuately about the associated divider end.

28. The facility of claim 25, wherein:
a) said two side walls have a length substantially in excess of the length of the other side walls of said one intermediate basin.

29. The facility of claim 28, wherein:
a) the side walls of the other basins have a uniform length, and the side walls of said one intermediate basin other than said two walls have a length equal to said uniform length.

30. The facility of claim 29, wherein:
a) each basin has six side walls.

* * * * *